United States Patent [19]

Devito

[11] Patent Number: 4,915,276
[45] Date of Patent: Apr. 10, 1990

[54] MOUNTING ASSEMBLY FOR A CARRIER ACCESSORY FOR VANS AND AUTOMOBILES

[76] Inventor: Ermin Devito, 123 Jefferson Ave., Green Brook, N.J. 08812

[21] Appl. No.: 247,490

[22] Filed: Sep. 22, 1988

[51] Int. Cl.[4] .............................................. B60R 9/08
[52] U.S. Cl. ........................... 224/42.43; 224/42.45 R; 224/42.03 A
[58] Field of Search ................ 224/42.03 A, 42.03 B, 224/42.03 R, 42.04, 42.07, 42.43, 42.44, 42.45 R; 280/415 A, 415 R, 769

[56] References Cited

U.S. PATENT DOCUMENTS

| | | | |
|---|---|---|---|
| 807,138 | 12/1905 | Story | 224/42.32 X |
| 1,498,715 | 6/1924 | Benoist | 224/42.43 |
| 1,648,211 | 11/1927 | Baker | 224/42.07 |
| 4,378,883 | 4/1983 | Profeta | 224/42.03 B X |
| 4,394,947 | 7/1983 | Tartaglia | 224/42.43 |
| 4,635,835 | 1/1987 | Cole | 224/42.03 B X |
| 4,640,658 | 2/1987 | Webb, Jr. | 224/42.03 R X |
| 4,676,413 | 6/1987 | Began et al. | 224/42.03 B |

FOREIGN PATENT DOCUMENTS

| | | | |
|---|---|---|---|
| 38139 | 11/1927 | Denmark | 224/42.03 B |
| 0041889 | 12/1981 | European Pat. Off. | 224/42.03 B |
| 0128088 | 12/1984 | European Pat. Off. | 224/42.03 B |
| 159716 | 7/1957 | Sweden | 224/42.03 R |

*Primary Examiner*—Henry J. Recla
*Assistant Examiner*—Casey Jacyna
*Attorney, Agent, or Firm*—Clifford G. Frayne

[57] ABSTRACT

A mounting assembly for a carrier accessory for vans and automobiles which is adapted to be removably secured to a standard tow hitch and to provide sufficient ground clearance to allow simultaneous use of the tow hitch, the mounting assembly comprising a pair of mounting brackets slidably insertable and securable in the ends of the tow hitch, the mounting brackets having outwardly extending arms for receipt of a horizontal leg of the mounting frame for the carrier assembly, the horizontal legs slidably insertable and securable within the mounting brackets, these legs shaped so as to provide a frame platform for securing the carrier accessory.

2 Claims, 3 Drawing Sheets

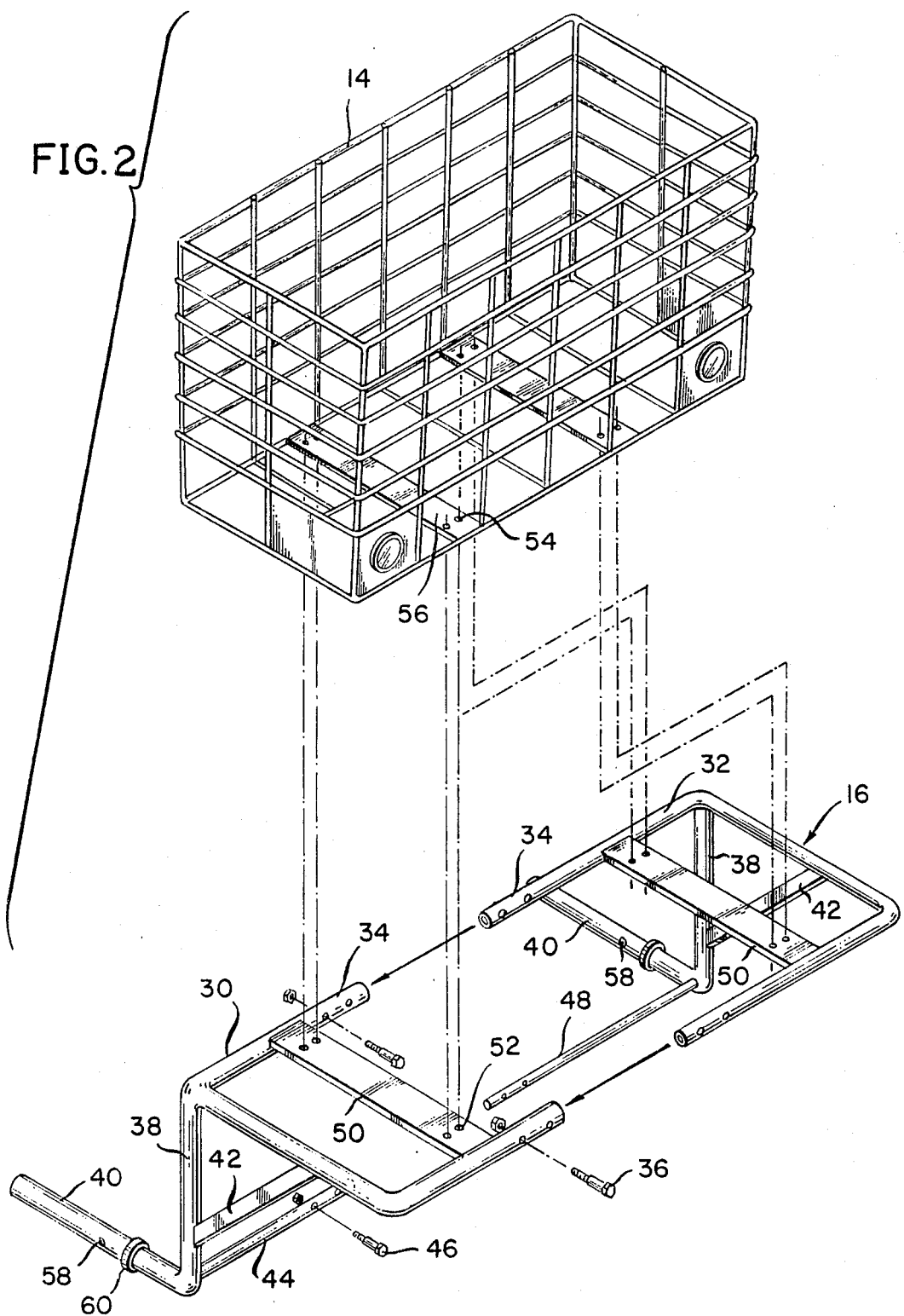

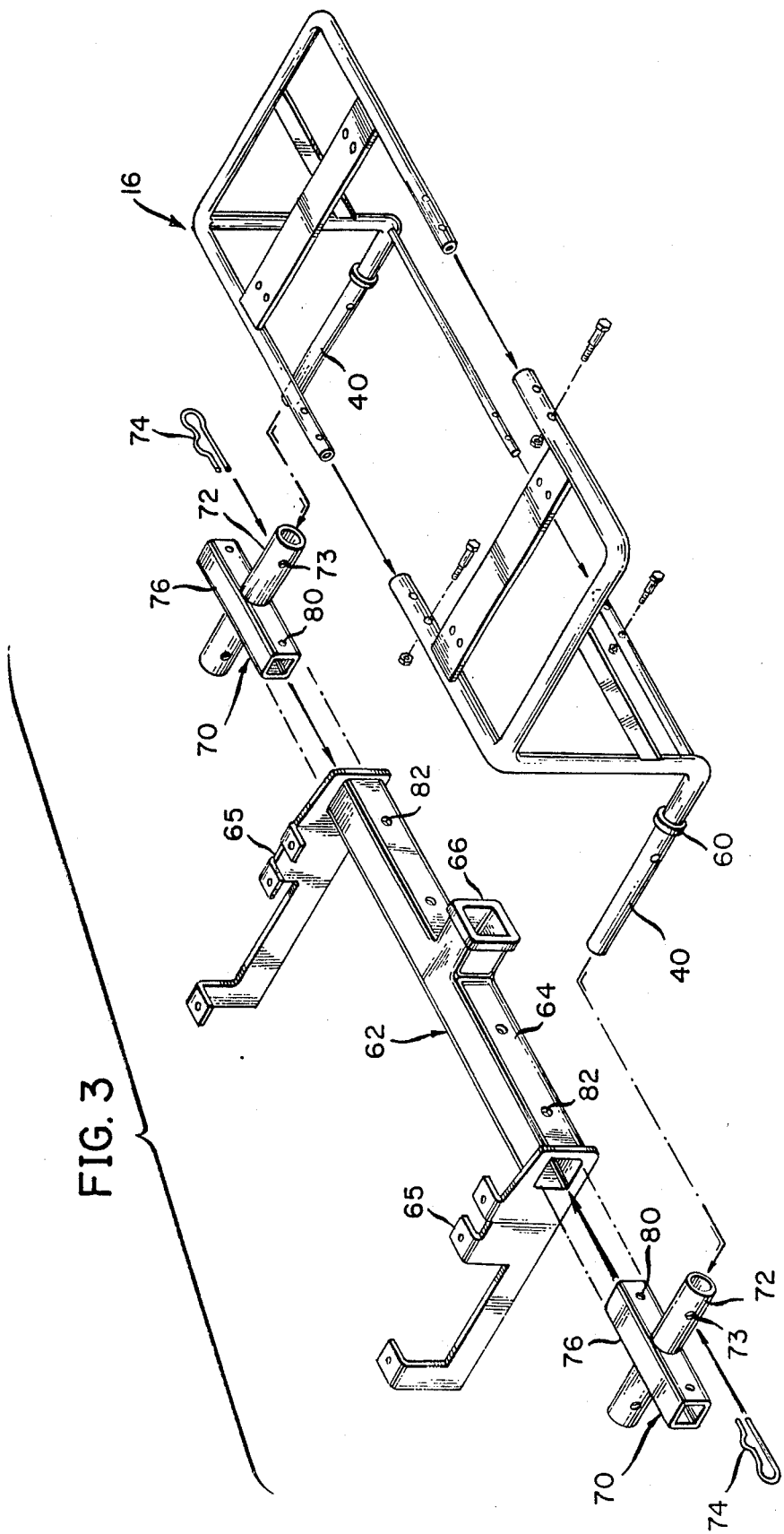

MOUNTING ASSEMBLY FOR A CARRIER ACCESSORY FOR VANS AND AUTOMOBILES

FIELD OF INVENTION

This invention relates to an exterior carrier assembly for vans and automobiles and, more particularly, to a mounting method for such carrier adapted to a standardized tow hook.

BACKGROUND OF THE INVENTION

Applicant's invention is directed towards a new, useful and improved method for mounting a carrier mechanism exterior to an automobile or van for additional storage capacity for traveling. Many attempts have been made with respect to the addition of additional storage capacity for automobiles and vans by the mounting of a storage mechanism carrier on the rear bumper of an automobile whether the carrier be enclosed or open. Each of the improvements or inventions discussed hereafter have utilized mounting methods for the particular item or items which mounting methods have been peculiar to the particular item. Applicant's invention relates to a mounting method for a carrier which is a modification or adaptation of a standard tow hook normally associated with automobiles, vans or four-wheel drive vehicles which permits the owner to easily and efficiently mount and dismount a carrier which depending upon the owner's preference, may be open or enclosed, but remains secured to the vehicle and is easily installed and removed.

U.S. Pat. No. 2,054,800 to Adams discloses a load supporting device for automobiles which device requires substantial modifications to the rear bumper and undercarriage for support of the carrier.

U.S. Pat. No. 807,138 discloses an egg case carrying attachment for vehicles, primarily for horse-drawn carriages.

U.S. Pat. No. 3,163,339 discloses a folding carry-on for vehicles which mounts on the rear bumper and contains an enclosed container with a bracket mounting device which permits the fold down access to the carrier.

U.S. Pat. No. 3,176,903 discloses a two-wheeled vehicle carrier for mounting on the rear bumper of an automobile for the carriage of two-wheeled vehicles such as motorcycles, bicycles or the like, which discloses horizontal mounting bars for the receipt of the two-wheeled vehicle wheels, the mounting device being secured into brackets which are secured to the undercarriage of the vehicle or to the rear bumper.

U.S. Pat. No. 3,202,332 discloses a luggage carrier which is mounted to the rear bumper and frame of the vehicle and which permits the luggage carrier to be swung away from the rear bumper of the vehicle such that it is positioned either parallel to the bumper or at ninety degrees to the bumper to permit the operator to gain access to the trunk of the vehicle. This device requires permanent mounting bolts to the rear bumper and to the undercarriage or frame of the vehicle.

U.S. Pat. No. 3,228,576 discloses a luggage carrier which is primarily specifically designed to a popular German import, namely, the Volkswagen Beetle, which permits additional luggage carrying space as a result of the lack of space in the vehicle itself.

U.S. Pat. No. 3,251,520 discloses a roll-out carrier designed for attachment to the rear of a vehicle and in particular, to the rear of a pickup truck in the embodiment as shown which mounts to the rear bumper and to the undercarriage of the vehicle.

U.S. Pat. No. 3,687,344 discloses a rear mounted snowmobile cargo box with towbar extension. This device is designed for attachment to the rear of a snowmobile to permit the carriage of additional equipment on a snowmobile primarily designed for operation in winter weather. This device comprises a container which is removably secured to a snowmobile.

U.S. Pat. No. 4,241,858 discloses a carrier accessory for vans. This device comprises a pedestal mount attached to the rear bumper of a van which secures an enclosed container at a height approximate to the level of the rear windows of the van. The height of the container is adjustable as a result of a plurality of apertures in the pedestal, but nevertheless, the pedestal is supported by the upper rear surface of the rear bumper of the van.

U.S. Pat. No. 4,320,862 discloses a rear baggage container for automobiles which container is secured by means of adjustable straps to the rear fender well of the automobile and which rests primarily on the rear bumper of the fender well.

U.S. Pat. No. 4,593,840 discloses a load carrying unit for attachment to vehicles which is secured by means of a bracket to a standard ball joint towing unit mounting underneath the rear axle of an automobile, the device as disclosed, has its own rotatable wheels for securing it to the standard ball joint and then raising it above the standard ball joint of the rear axle of an automobile.

U.S. Pat. No. 4,671,439 discloses a luggage carrier apparatus for a vehicle for attachment of an enclosed container to the rear of a van which container is mounted on the rear bumper of the van and contains a variety of locking mechanisms to prevent access by unauthorized personnel.

All of the aforementioned patents suffer from the same deficiency, namely, that they are cumbersome, difficult to attach to the vehicle, not easily removable, not adaptable to standard connections and which do not provide the owner of the vehicle with the option of having an open or enclosed carrier secured to the vehicle.

Applicant's invention is of lightweight construction and is adaptable to a standard tow hook utilized in most automobiles, vans and four-wheel drive vehicles and which is easily installed, secured, and removed by the owner with the capability of being permanently secured in place by means of a lock mechanism and which permits the owner to have additional carrying capacity for valuable items in an enclosed container or bulky items in an unenclosed container.

SUMMARY OF INVENTION

The invention comprises a tubular frame which supports either an open or enclosed carrier, the tubular frame is slidably secured to a tubular bracket, the tubular bracket having a rectangular cross leg which is secured to a standardized tow hitch whose modification requires only the positioning of apertures to permit the insertion of lock pins to secure the bracket.

OBJECTS OF THE INVENTION

It is an object of the present invention to provide an improved mounting mechanism for an exterior carrier assembly for vans and automobiles.

It is a still further object of the present invention to provide a novel carrier assembly and mounting mechanism which permits the operator ease of installation and removal.

It is a still further object of the present invention to provide a novel mounting mechanism for a carrier assembly for vans and automobiles which utilizes a modified standardized tow hitch and which permits the use of the tow hitch with the carrier assembly in position.

BRIEF DESCRIPTION OF THE DRAWINGS

A better understanding of the present invention as well as other objects and advantages thereof will become apparent upon consideration of the detailed disclosure thereof especially when taken with the accompanying drawings wherein:

FIG. 2 is a prospective exploded view of the carrier assembly frame and basket;

FIG. 3 is a perspective exploded view of the carrier assembly frame and mounting bracket together with standardized tow hitch modifed to receive the carrier assembly frame.

DETAILED DESCRIPTION OF THE DRAWINGS

Figure 1:
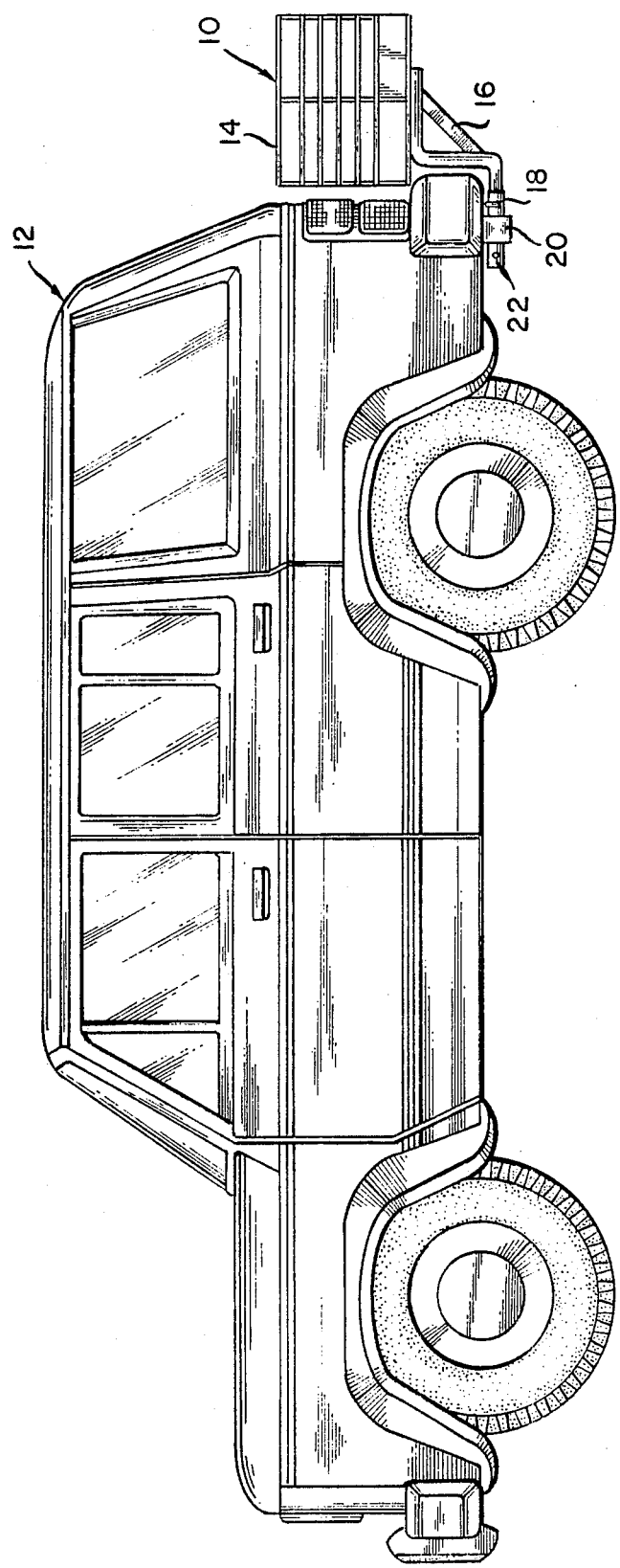
FIG. 1 is a side elevational view of the carrier assembly removably secured to a tow hitch on a vehicle.

Referring to FIG. 1, there is shown a side elevational view of the carrier assembly 10 secured to the rear of vehicle 12. In the embodiment shown, carrier assembly 10 comprises a wire frame basket 14 mounted on a tubular frame assembly 16. Tubular frame assembly 16 is removably secured to a tubular bracket 18 which has a rectangular cross member 20 which is secured to a standardized tow hook 22.

Referring to FIG. 2, there is shown an exploded view of the basket carrier 14 and frame assembly 16. Frame assembly 16 is designed to comprise two interlocking sections in order to accommodate trailer hitches and vehicles of varying widths. Frame assembly 16 comprises two substantially U-shaped horizontal tubular members 30 and 32. U-shaped members 30 and 32 are disposed in a horizontal plane with the tubular diameter of one U-shaped member slightly larger than the tubular diameter of the other U-shaped member so as to permit the legs of one U-shaped member to be slidably received within the other U-shaped member. A plurality of coincidental openings 34 in the U-shaped members permit them to be secured together by fastening means 36 in order to accommodate tow hitches and vehicles of varying widths.

Each U-shaped member 30 and 32 has a vertically depending leg 38 and a horizontally extending leg 40. Vertical leg 38 provides for the vertical disposition of the frame to allow sufficient ground clearance and horizontal leg 40 is designed to be secured to the mounting bracket as described hereafter. A support strut 42 extends between vertical legs 38 and U-shaped horizontal members 30 and 32 to provide additional support for frame 16. Additionally, a tubular horizontal support 44 is positioned either between vertical legs 38 or horizontal legs 40 to provide additional support. Horizontal support strut 44 again has tubular members of unequal diameter so that one tubular member may be slidably received within the other and secured by a fastening means 46 through coincidental apertures 48 similar to the manner in which U-shaped members 30 and 32 are secured together.

U-shaped members 30 and 32 have planer support struts 50 disposed between the legs of U-shaped members 30 and 32 in a horizontal plane, planer support strut 50 having a plurality of apertures 52 therethrough which are coincidental with a plurality of apertures 54 in a similar planer support strut 56 secured to carrier 14. Carrier 14 in the embodiment shown comprises a wire mesh basket rectangular in shape with an open top. Planer support struts 56 in carrier basket 14 are aligned with planer support struts 50 in frame 16 and fastening means are utilized with coincident apertures 52 and 54 to secure carrier 14 to frame 16.

Horizontal legs 40 of frame carrier 16 contain a series of apertures 58 to secure the frame to the mounting hitch as best understood with reference to FIG. 3. Proximate to apertures 58 on horizontal leg 40 of frame 16 are annular alignment stoppers 60 which are fixed in position to aid in alignment of apertures 58 with the mounting bracket.

Referring to FIG. 3, there is shown mounting frame 16 without carrier basket 14 secured thereto. A standard tow hitch 62 is secured to the undercarriage of vehicle 12 by means of mounting brackets 65. Tow hitch 62 is comprised of tubular members which are rectangular in cross sectional area. Tow hitch 62 comprises a transverse member 64 and a longitudinal member 66, longitudinal member 66 designed to receive the tongue of a trailer hitch.

Applicant's carrier assembly is easily secured to such a tow hitch by means of a mounting bracket 70. Mounting bracket 70 comprises a tubular member 72 circular in cross sectional area and slightly larger in diameter than the diameter of leg 40 of frame assembly 16. Tubular member 72 has an aperture therethrough for alignment with aperture 58 in leg member 40 so as to secure leg member 40 in position by means of a lock pin 74. Apertures 73 and 58 are aligned by means of annular stopper 60 on leg 40. Mounting bracket 70 has a tranverse member 76 which is rectangular in cross sectional area and slightly smaller than transverse member 64 of tow hitch 62. This permits mounting bracket 70 to be slidably secured to tow hitch 62 by sliding transverse member 76 within transverse member 64 of tow hitch 62 and aligning apertures 80 in mounting bracket 70 with apertures 82 in transverse member 64 for a securing means or lock pin. In this configuration, mounting bracket 70 is secured to each end of transverse member 64 of tow hitch 62. Mounting frame 16 is then positioned such that horizontal legs 40 are slidably received within tubular member 72 of mounting bracket 70 and secured in position by means of lock pin 74.

Mounting frame 16, together with carrier basket 14, are of such a design and weight that a single individual can position horizontal legs 40 to be slidably received within mounting bracket 70, insert horizontal legs 40 and then secure the frame by means of lock pin 74. A single individual can reverse the process for removal of the carrier assembly.

In the configuration as shown, mounting bracket 70 can be permanently installed on tow hitch 62 and lock pin 74 can be utilized to secure the frame assembly 16 and carrier 14 to mounting bracket 70 when so desired. In the instant embodiment, Applicant has shown the carrier assembly and the mechanism with respect to a wire mesh basket having an open top. The ease with which the mounting mechanism allows the carrier assembly to be installed and removed also permits the installation of an enclosed container incorporated with the frame assembly for the carriage of items or goods which the operator does not wish to have exposed to the ambient weather conditions. The shape or configuration of such an assembly will be in keeping with the present invention which is directed toward a mounting mechanism for a standardized tow hook which requires little modification and permits the operator, individually, to install and remove the frame assembly and carrier in an expeditious manner without the requirement of additional help.

Applicant's design also permits adequate ground clearance for the carrier accessory and allows the use of the tow hitch without interference from the carrier assembly.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A mounting assembly for a carrier accessory for vans or automobiles adapted to be removable secured to a standard tow hitch, said tow hitch having a horizontal member mounted beneath said vehicle, said horizontal member running parallel to the rear bumper of said vehicle, said horizontal member being opened at each end, defining an inner cross sectional area, said mounting assembly comprising:

a pair of mounting brackets each having first and second cross members, the cross sectional area of said first cross member being substantially identical to the cross sectional area of said inner cross sectional area of said tow hitch cross member, said first cross member slidably insertable into each end of said tow hitch cross member and having an aperture therethrough for alignment with an aperture through said tow hitch cross member for receipt of a securing means to secure said mounting bracket to said ends of said tow hitch cross member;

said second cross member, substantially perpendicular to said first cross member and extending horizontally rearwardly toward said rear bumper of said vehicle, said second cross member defines a channel having an aperture therethrough perpendicular to said channel;

a carrier assembly comprising a support frame and container secured to said support frame, said support frame having Z-shaped outer legs, said Z-shaped outer legs having a first horizontal member having an aperture therethrough, said first horizontal member having a cross sectional area substantially identical to the inner cross sectional area of said channel of said second cross member of said mounting bracket, said first horizontal member of said Z-shaped legs of said frame slidably insertable to said second cross member of said mounting bracket, said aperture on said mounting bracket and said aperture on said first horizontal member of said Z-shaped leg alignable for receipt of a securing means; said first horizontal member of said Z-shaped leg of said frame having secured thereto an aligning stopper, said aligning stopper contacting said second cross member of said mounting bracket to limit the slidable insertion of said horizontal member of said Z-shaped leg, prealigning the apertures in said second cross member of said mounting bracket with said apertures in said first horizontal member of said Z-shaped leg for receipt of said securing means.

2. An apparatus in accordance with claim 1 wherein said container secured to said frame comprises an opener and closed container secured in a horizontal platform defined by said second horizontal member of said Z-shaped leg and cross member secured thereto, said mounting container and assembly positioned above said rear bumper to permit the normal functional use of said tow hitch.

* * * * *